Jan. 2, 1951  A. J. RUGGIERO  2,536,467
SAFETY HEADGEAR SUSPENSION
Filed Jan. 28, 1949

INVENTOR
ALFRED J. RUGGIERO
BY Charles S. Evans
his ATTORNEY

Patented Jan. 2, 1951

2,536,467

UNITED STATES PATENT OFFICE 2,536,467

SAFETY HEADGEAR SUSPENSION

Alfred J. Ruggiero, San Francisco, Calif., assignor to E. D. Bullard Company, San Francisco, Calif., a corporation of California Application January 28, 1949, Serial No. 73,395

2 Claims. (Cl. 2—6)

My invention relates to safety headgear, and particularly to suspension means for fitting and supporting such a headgear on the head of a wearer.

It is among the objects of my invention to provide an improved arrangement of sweatband and suspension head straps by which a rigid safety headgear may be fitted onto the head of a wearer.

Another object is to provide suspension means for safety headgear having fastening means facilitating the assembly of the suspension in a hat crown, and which affords an effective range of initial adjustment and yielding movement in service.

A further object is to provide a safety headgear suspension embodying improved features of structure and arrangement.

The invention has other objects which will be explained in the following description of that form of the invention which is illustrated in the drawings. It is to be understood that the invention is not limited to this single embodiment, but may be included in a plurality of forms as set forth in the claims.

Figure 1:
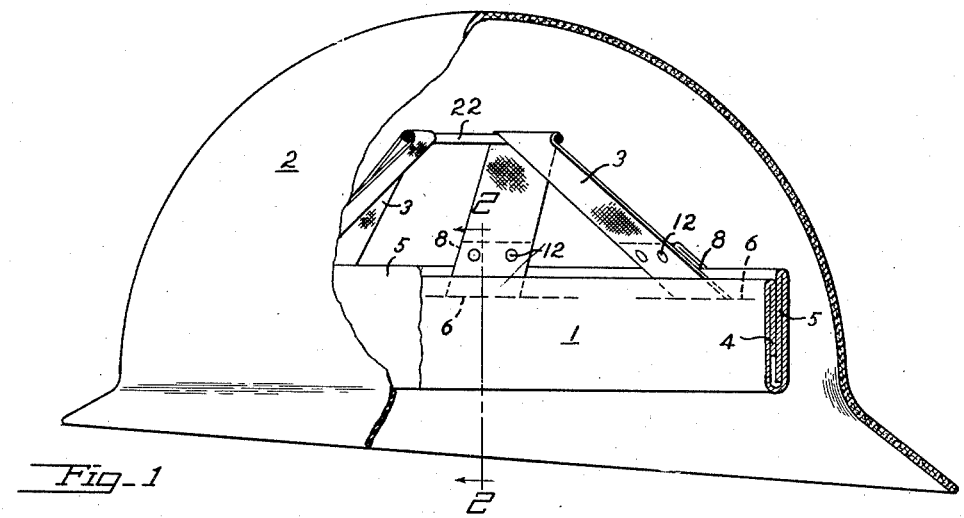
Figure 1 is a side elevation of a safety headgear provided with the suspension device of my invention, parts being broken away and shown in vertical mid-section.
Figure 5:
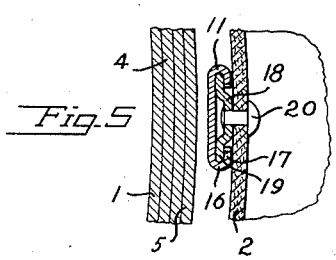
Figure 5 is an enlarged sectional detail of the support and fastener, the plane of the section being indicated by the line 5—5 of Figure 2.
Figure 3:
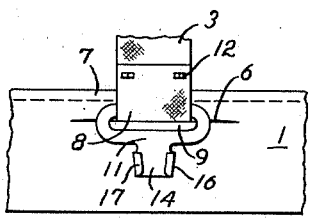
Figure 3 is a fragmental elevational view showing the manner in which the suspension head straps engage the sweatband and fasteners.
Figure 2:
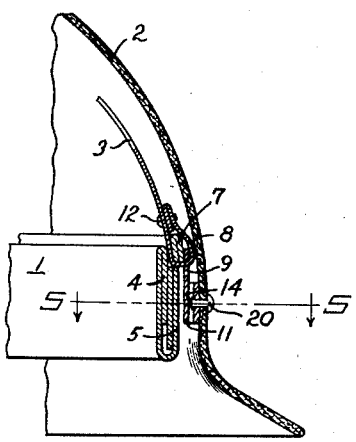
Figure 2 is a sectional view of the suspension and its mounting means, the plane of the section being indicated by the line 2—2 of Figure 1.
Figure 4:
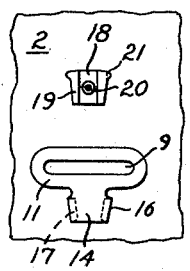
Figure 4 is a fragmental exploded view of the fastener and the support interengageable therewith as mounted upon the lower inside surface of the headgear, the suspension head strap being omitted.

In terms of broad inclusion, the headgear suspension of my invention comprises a sweatband having slits circumferentially spaced along the band for shiftable engagement by loops formed at both ends of each of a plurality of suspension straps. The mid-portions of the straps are adjustably connected within the upper portion of the crown portion of the headgear; and fasteners are suspended upon the suspension strap loops between the sweatband and the lower portion of the crown. The fasteners are shaped for wedging interengagement with supports secured within the lower crown portion of the headgear.

In terms of greater detail, the suspension device of my invention comprises a sweatband designated in general by the numeral 1 supported with the lower crown portion of a safety hat 2 by means of suspension head straps 3.

The sweatband is preferably formed from a strip of flexible material, for example leather or fabricoid, doubled lengthwise to form a multithickness band having an inner head engaging portion 4 and an outer mounting portion 5. The ends of the strip are joined to form a continuous band fitting around the head of a wearer. Preferably, the ends of the band may be adjustably connected by suitable connecting means, as for example the arrangement disclosed in my Patent No. 2,398,561, whereby the sweatband may be readily adjusted to fit any head size. Slits 6 are cut in the outer or mounting portion 5 of the sweatband at intervals circumferentially spaced around the band, and in spaced parallel relation to the upper edge of the sweatband to form mounting strips 7.

The suspension or head straps 3 are preferably of woven tape material. Each strap 3 is provided with a loop 8 at each end thereof, the loops being formed by doubling the extreme end portion back onto the adjacent portion of the strap body.

The ends of each strap 3 are threaded through adjacent slits 6 in the sweatband 1, and through slots 9 formed in fasteners 11, before said ends are doubled back to their loop forming position. After the ends are so threaded and doubled back they are secured by rivets 12, or other suitable securing means, with the fasteners and sweatband embraced and retained within the loops 8.

The fasteners 11 are provided with downwardly extending wedge shaped portions 14 having side flanges 16 converging toward the lower end of said portions. The outer edges of the flanges 16 are inturned as at 17 to form sockets for engaging supports 18 secured upon the inner surface of the crown portion of the headgear, by rivets 20.

The supports 18 are preferably metal plates of essentially wedge shape and having side edges converging downwardly. Edge portions 19 of the support plate 18 are offset sufficiently to admit the inturned portions 17 of the fasteners between the edge portions 19 and the surface of the hat. The socket portions of the fasteners 11 are complementary to the supports 18 and are arranged to be moved into detachable interwedging engagement therewith. Lateral extensions 21 on the upper ends of the offset edge portions 19 limit the movement of the fastener sockets on the supports 18.

The mid-portions of the suspension head strap 3, between the loops 8, extend upwardly into the upper crown portion of the headgear in the form of an inverted V, having portions converging from the slits 6 to a fold approximately midway between the looped ends of the straps. A tie cord 22 is threaded between the converging portions of the straps for adjustably connecting the mid-portions of the straps to conform to the head of the wearer and support the rigid crown in spaced relation to the head of all points.

The slits 6 are of a length sufficient to permit a range of relative movement between the loops 8 and the mounting strips 7 sufficient to permit the sweatband to conform to the shape of the wearer's head without distortion of the straps 3 or disalinement of the fasteners 11 and supports 18. The fasteners lie flat between the sweatband and the crown; and the sweatband, being suspended on the loops 8 along with the fasteners, provides an effective shield between the fasteners and the head of the workman.

I claim:

1. A suspension for safety headgear having a rigid crown comprising a plurality of head straps each having a loop formed at each end, a fastener associated with each loop and having an eye through which the loop extends, a sweatband having slits forming portions each of which is embraced by a loop in proximate relation to the associated fastener, and supporting means secured inside the hat for separably engaging the fasteners.

2. A suspension for safety headgear having a rigid crown comprising a sweatband having a plurality of slits circumferentially spaced around the sweatband in spaced parallel relation to the upper edge of the band, a plurality of head straps each having a loop at each end interengaging the band through adjacent slits, means engaging the straps between their ends for adjustably connecting the mid-portions of the straps within the upper portion of the crown, a plurality of fasteners each having an eye through which a loop extends and positioned between the sweatband and the lower part of the crown, and supports upon the crown separably interengageable with the fasteners.

ALFRED J. RUGGIERO.

REFERENCES CITED

The following references are of record in the file of this patent:

UNITED STATES PATENTS

| Number | Name | Date |
| --- | --- | --- |
| 2,159,681 | Wisman | May 23, 1939 |
| 2,371,712 | Scholl et al. | Mar. 20, 1945 |
| 2,398,561 | Ruggiero | Apr. 16, 1946 |
| 2,455,797 | Myers et al. | Dec. 7, 1948 |